US006049880A

United States Patent [19]

Song

[11] Patent Number: 6,049,880

[45] Date of Patent: Apr. 11, 2000

[54] COMPUTER DISPLAY MONITOR APPARATUS AND METHOD FOR CONTROLLING POWER THEREOF

[75] Inventor: Moon-Jong Song, Kyounggi-do, Rep. of Korea

[73] Assignee: SamSung Electronics Co., Ltd., Kyungki-do, Rep. of Korea

[21] Appl. No.: 08/999,192

[22] Filed: Dec. 19, 1997

[30] Foreign Application Priority Data

Dec. 19, 1996 [KR] Rep. of Korea ...................... 96-68095

[51] Int. Cl.[7] ........................................................ G06F 1/28

[52] U.S. Cl. .......................... 713/300; 713/340; 345/211; 361/679; 361/681; 361/682; 323/278; 323/286

[58] Field of Search ..................................... 713/300, 340; 361/679, 681, 682; 345/467–472, 211, 213, 214, 905; 323/278, 286

[56] References Cited

U.S. PATENT DOCUMENTS

| | | |
|---|---|---|
| 4,373,183 | 2/1983 | Means et al. . |
| 4,395,710 | 7/1983 | Einolf, Jr. et al. . |
| 4,528,662 | 7/1985 | Floyd et al. . |
| 5,448,554 | 9/1995 | Van Steenbrugge . |
| 5,485,458 | 1/1996 | Oprescu et al. . |
| 5,537,026 | 7/1996 | Estes et al. ............................. 323/239 |
| 5,596,756 | 1/1997 | O'Brien . |
| 5,615,404 | 3/1997 | Knoll et al. . |
| 5,621,901 | 4/1997 | Morriss et al. . |
| 5,623,610 | 4/1997 | Knoll et al. . |
| 5,640,574 | 6/1997 | Kawashima . |
| 5,666,545 | 9/1997 | Marshall et al. . |
| 5,675,809 | 10/1997 | Gantt . |
| 5,675,813 | 10/1997 | Holmdahl . |
| 5,682,547 | 10/1997 | Sekiya . |
| 5,694,555 | 12/1997 | Morriss et al. . |
| 5,871,368 | 2/1999 | Erdner et al. ........................... 439/188 |

*Primary Examiner*—Xuan M. Thai
*Attorney, Agent, or Firm*—Robert E. Bushnell, Esq.

[57] ABSTRACT

A computer monitor having a universal serial bus system comprises a primary power supply that supplies power to the associated circuits of the computer monitor, a hub power supply that supplies hub power through universal serial bus ports to peripheral devices, and a hub power controller that cuts off the hub power to the peripheral devices when the hub power exceeds a predetermined power level. The computer monitor includes an on-screen display controller that displays the status of hub power on a partial area of a computer monitor screen.

20 Claims, 5 Drawing Sheets

COMPUTER DISPLAY MONITOR APPARATUS AND METHOD FOR CONTROLLING POWER THEREOF

CLAIM OF PRIORITY

This application makes reference to, incorporates the same herein, and claims all benefits accruing under 35 U.S.C. §119 from an application for COMPUTER DISPLAY MONITOR APPARATUS AND METHOD FOR CONTROLLING POWER THEREOF earlier filed in the Korean Industrial Property Office on the 19th day of Dec. 1996, and there duly assigned Ser. No. 96-68095, a copy of which is annexed hereto.

BACKGROUND OF THE INVENTION

1. Technical Field

The present invention relates to a display monitor apparatus used with a computer system, and more particularly to a display monitor apparatus having an internal power supply and components of a universal serial bus system, and a method for controlling power supplied to peripheral devices through universal serial bus hubs.

2. Related Art

A typical personal computer has peripheral devices connected, such as a monitor and keyboard. A user might want to use additional peripheral devices, such as a mouse, printer, light pen, or plotter. When a user tries to use multiple peripheral devices with a computer, it can be difficult to connect them since each peripheral typically has a unique type of connector. The user must carefully match the plug from each peripheral with a corresponding connector on the computer due to all the different connector types. Also, it can be difficult to configure the computer to communicate with all the peripheral devices due to the fact that some peripheral devices require unique types of hardware and software. The task of adding peripheral devices to a computer can be especially arduous for computers that do not support Plug-and-Play.

To solve the above described problems, a universal serial bus system has been developed. The universal serial bus is a basic system for connecting peripheral devices to a computer. Peripheral devices connected to a universal serial bus system are also referred to as universal serial bus peripheral devices.

Some examples of universal serial bus systems are disclosed in U.S. Pat. No. 5,615,404 for System Having Independently Addressable Bus Interfaces Coupled to Serially Connected Multi-Ported Signal Distributors Generating and Maintaining Frame Based Polling Schedule Favoring Isochronous Peripherals issued to Knoll et al., U.S. Pat. No. 5,621,901 for Method and Apparatus for Serial Bus Elements of an Hierarchical Serial Bus Assembly to Electrically Represent Data and Control States to Each Other issued to Morriss et al., U.S. Pat. No. 5,623,610 for System for Assigning Geographical Addresses in a Hierarchical Serial Bus by Enabling Upstream Port and Selectively Enabling Disabled Ports at Power On/Reset issued to Knoll et al., U.S. Pat. No. 5,675,813 for System and Method for Power Control in a Universal Serial Bus issued to Holmdahl, and U.S. Pat. No. 5,694,555 for Method and Apparatus for Exchanging Data, Status, and Commands Over an Hierarchical Serial Bus Assembly Using Communication Packets issued to Morriss et al.

A computer display monitor apparatus having some elements of a universal serial bus system is disclosed in U.S.

Ser. No. 08/852,732 for Monitor for Use With Computer System and Method of Controlling Supply of Power to Computer Peripherals Connected With the Monitor, filed with the U.S. Patent and Trademark Office on May 7, 1997.

Some examples of improvements related to serial buses are disclosed in U.S. Pat. No. 5,448,554 for Data Communication System Based on a Serial Bus and a Monitor Station for Use With Such System issued to Van Steenbrugge, U.S. Pat. No. 4,528,662 for Multiplex Control System Having Enhanced Integrity issued to Floyd et al., U.S. Pat. No. 4,395,710 for Bus Access Circuit for High Speed Digital Data Communication issued to Einolf, Jr. et al., and U.S. Pat. No. 4,373,183 for Bus Interface Units Sharing a Common Bus Using Distributed Control for Allocation of the Bus issued to Means et al.

An example of a bus interconnect circuit is disclosed in U.S. Pat. No. 5,485,458 for Bus Interconnect Circuit Including Port Control Logic for a Multiple Node Communication Network issued to Oprescu et al. An example of status management in a system having peripheral devices is disclosed in U.S. Pat. No. 5,682,547 for Status Management and Data Transmission in a System Comprising Peripherals and a Controller Thereof issued to Sekiya. An example of a method for transferring video information is disclosed in U.S. Pat. No. 5,666,545 for Direct Access Video Bus Computer-System and Method for Transferring Video Information Using a Dedicated Video Bus issued to Marshall et al.

Some examples of power management for computer systems are disclosed in U.S. Pat. No. 5,596,756 for Sub-Bus Activity Detection Technique for Power Management Within a Computer System issued to O'Brien, U.S. Pat. No. 5,640,574 for Portable Computer Apparatus Having a Displays Capable of Displaying Power Management Information and Method of Controlling the Display issued to Kawashima, and U.S. Pat. No. 5,675,809 for Voltage Control Circuit for a Dual Voltage Bus Computer System issued to Gantt.

I have discovered that it would be desirable to further enhance a display monitor apparatus to enable it to control and monitor power supplies of universal serial bus peripheral devices, and to communicate the status of such power supplies to a user.

SUMMARY OF THE INVENTION

Accordingly, it is therefore an object of the present invention to provide a display monitor apparatus which has a universal serial bus system and which is able to prevent universal serial bus peripheral devices from device failures due to excessive power.

It is another object to provide a display monitor apparatus having a universal serial bus system and which is able to communicate a universal serial bus hub power status to a user.

It is still another object to provide a display monitor apparatus having a universal serial bus system and a method of controlling power supply of the display monitor apparatus.

It is yet another object to provide a display monitor apparatus having a universal serial bus system and an on-screen display controller for displaying hub power status on a partial area of the display monitor apparatus to inform a user of such hub power status.

It is another object to provide a display monitor apparatus having a universal serial bus system and a detecting circuit which detects whether a universal serial bus hub supply voltage is beyond a predetermined voltage and generates a detection signal when the universal serial bus hub supply voltage exceeds the predetermined voltage.

These and other objects of the present invention can be achieved by providing a display monitor apparatus to be used with a computer system and having universal serial bus hubs for connecting universal serial bus peripheral devices to the computer system. The display monitor apparatus comprises a primary power supply, a hub power supply, and a hub power controller. The primary power supply supplies a variety of direct current (DC) power levels to associated monitor circuits using an alternating current (AC) power supply. The associated monitor circuits can include a cathode ray tube heater circuit and a hub power supply. The hub power supply provides power to the universal serial bus peripheral devices using one of the direct current power levels. The hub power controller disconnects the power provided to the universal serial bus peripheral devices when the hub power exceeds a predetermined power level. The monitor apparatus further comprises an on-screen display controller for displaying hub power status on a partial area of a display monitor screen.

According to another aspect of this invention, there is provided a display monitor apparatus comprising a power supply, a plurality of universal serial bus hub ports with which the universal serial bus peripheral devices are respectively connected, a switching regulator, a detecting circuit, and a power controller. The power supply supplies a variety of direct current power levels to associated monitor circuits using an alternating current power supply. The plurality of universal serial bus hub ports receive a hub supply voltage from the switching regulator. The universal serial bus peripheral devices receive supply voltage via the universal serial bus hub ports. The detecting circuit detects whether the hub supply voltage is beyond a predetermined voltage and generates a detection signal when the hub supply voltage exceeds the predetermined voltage. The predetermined voltage could be the rated voltage. The power controller disables the switching regulator in response to the detection signal in order to disconnect hub supply voltage from the universal serial bus hub ports.

Still another aspect of this invention is that there is provided a method for controlling power of a display monitor apparatus which includes at least one universal serial bus hub having a plurality of hub ports connected with universal serial bus peripheral devices, a hub power supply for supplying a hub power to the hub ports, a hub power detector for detecting the hub power, a power controller for enabling/disabling the hub power supply, and an on-screen display controller for displaying hub power status on a partial area of a display monitor screen. The method comprises the steps of detecting the hub power, determining whether the hub power is in excess of a predetermined power or not, cutting off the hub power to the hub ports when the hub power exceeds the predetermined power, and displaying the hub power status on the partial area of the display monitor screen when the on-screen display of the hub power status is required.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

A universal serial bus system can include a computer, a bus controller and a number of hubs, ports and peripheral devices. The computer can act as the host. The bus controller provides flow control for data communications. A hub is a device comprising several ports. Each port in a hub is capable of being connected to a peripheral device or to another hub. A peripheral device is anything that can be connected to a computer. For example, a keyboard, mouse or printer. In a universal serial bus system, a peripheral device can communicate with the computer if the peripheral device is properly connected to a port of that universal serial bus system. A peripheral device connected to a universal serial bus system can be referred to as a universal serial bus peripheral device.

In a universal serial bus system, power can be supplied from one or more sources to a universal serial bus hub and then to the universal serial bus ports associated with that universal serial bus hub. A universal serial bus peripheral device connected to a universal serial bus port will receive power through the universal serial bus port. The bus controller is considered to be upstream of each universal serial bus peripheral device. Thus, all universal serial bus peripheral devices are considered to be downstream from the bus controller. A self-powered universal serial bus hub or universal serial bus peripheral device is defined as a device that receives power directly from a power supply such as a self contained power supply. A bus powered universal serial bus hub or a bus powered universal serial bus peripheral device is defined as a device which receives its power via the universal serial bus.

Figure 1:
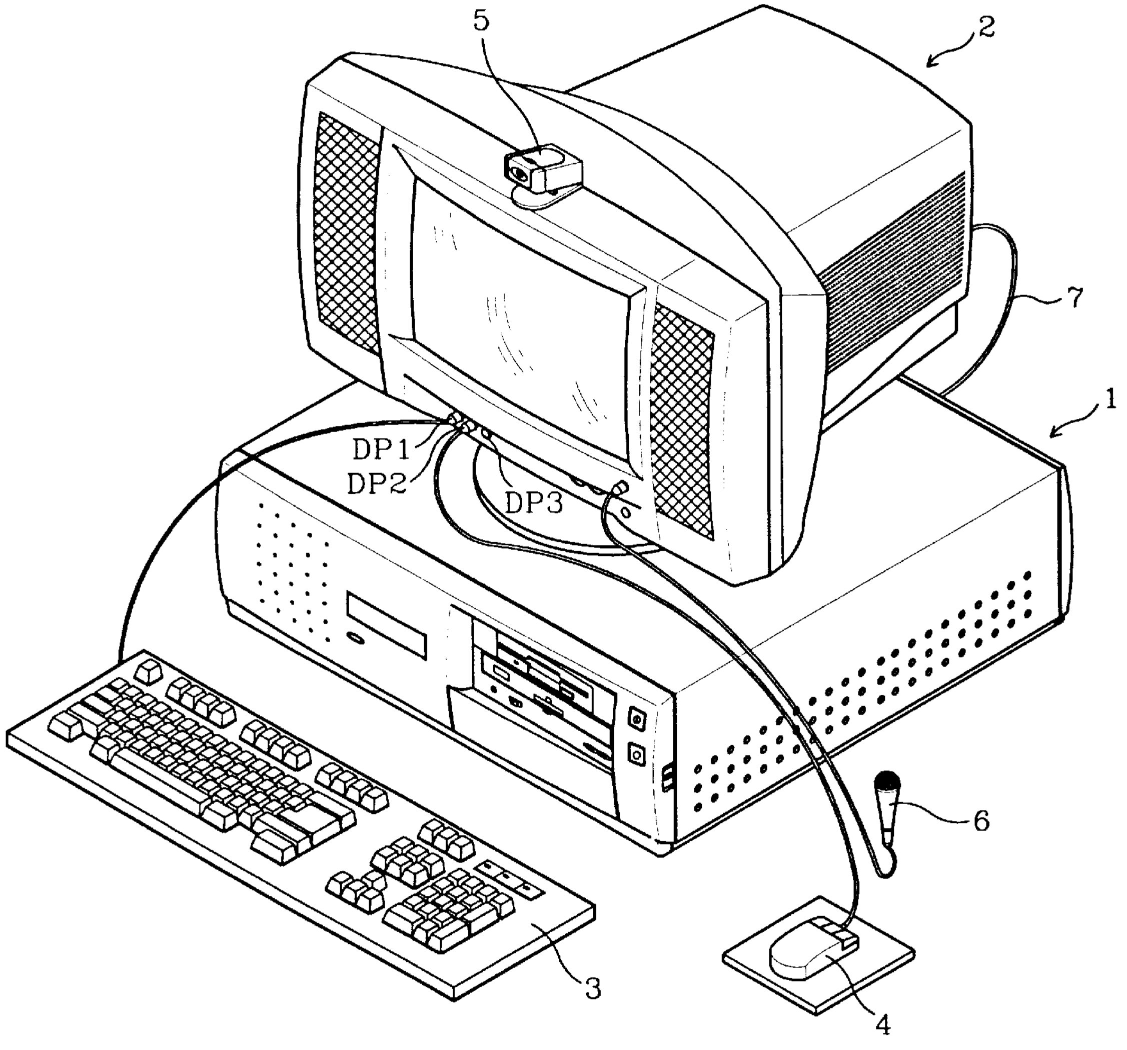
FIG. 1 illustrates a schematic diagram of a personal desktop computer system having a universal serial bus system.

Referring now to the drawings and particularly to FIG. 1, which illustrates a schematic diagram of a personal desktop computer system having a universal serial bus system. The computer system includes a system unit 1 serving as a host, and universal serial bus peripheral devices such as an associated cathode ray tube (CRT) display monitor 2 serving as a self-powered universal serial bus peripheral device, a keyboard 3, a mouse 4, a digital video camera 5, and a microphone 6. Although not shown in the figure, the computer system may have other universal serial bus peripheral devices such as a printer, a plotter, a scanner, a light pen, a modem, loudspeakers and other devices. The operation of these conventional components is well understood. Therefore, for the sake of clarity, these elements are not illustrated.

In FIG. 1, the display monitor 2 is connected upstream to a root universal serial bus hub (not shown) of the system unit 1 via a universal serial bus cable 7. In other words, the display monitor 2 is connected upstream to system unit 1 via a root universal serial bus hub (not shown). The display monitor 2 is connected downstream to the universal serial bus peripheral devices through the downstream ports, for example DP1, DP2, and DP3, of a universal serial bus hub (not shown) incorporated into the display monitor 2.

Figure 2:
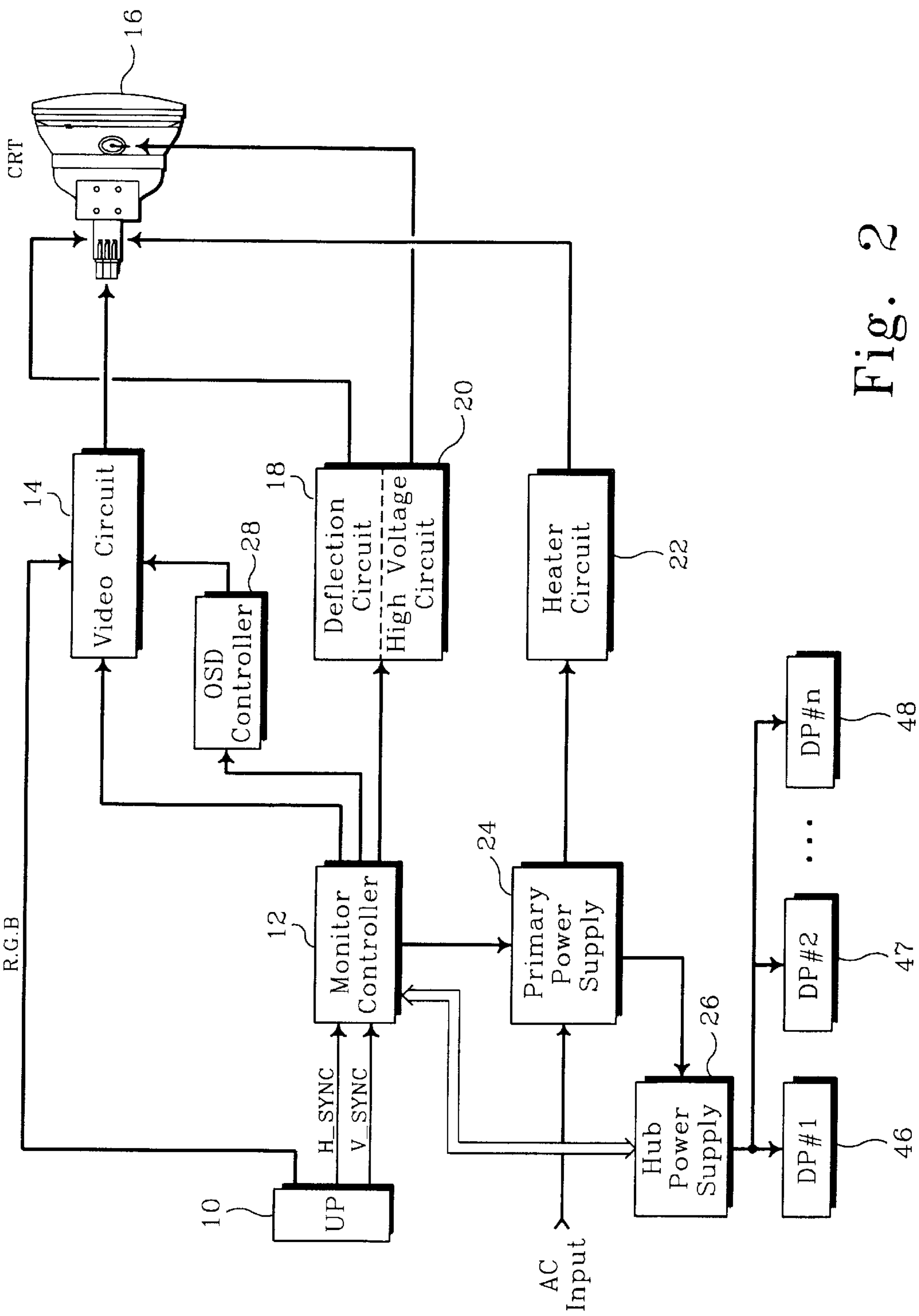
FIG. 2 illustrates a block diagram of the circuit construction of a novel monitor circuit, according to the principles of the present invention.

Referring now to FIG. 2, which illustrates a block diagram of the circuit construction of a novel monitor circuit, according to the principles of the present invention. Reference numeral 10 in FIG. 2 represents an upstream port of the universal serial bus hub incorporated into the display monitor 2 in FIG. 1. In other words, system unit 1 in FIG. 1 is connected to display monitor 2 in FIG. 1 via upstream port 10 in FIG. 2. Reference numerals 46, 47 and 48 in FIG. 2 represent downstream ports of the universal serial bus hub incorporated into the display monitor 2 in FIG. 1. universal serial bus peripheral devices can be connected to the ports 46, 47 and 48.

In FIG. 2, the monitor circuit includes a monitor controller 12, a video circuit 14, a cathode ray tube 16, a deflection circuit 18, a high voltage circuit 20, a heater circuit 22, a primary power supply 24, a hub power supply 26, and an on-screen display (OSD) controller 28. In FIGS. 1 and 2, the monitor controller 12 is composed of a microcomputer, and controls the operations of overall monitor circuit components depending upon the horizontal and vertical synchronizing signals from the system unit 1, that is, host, of the computer system and other internal/external signals. The video circuit 14 is provided to process the video signals R (red), G (green) and B (blue) from the system unit 1 via the universal serial bus cable 7 connected between the system unit and the monitor circuit, and to supply the processed video signals to the electron guns of the cathode ray tube 16. The deflection circuit 18 supplies sawtooth wave signals to horizontal and vertical yokes (not shown) provided around the neck of the cathode ray tube 16 in synchronization with the horizontal and vertical synchronizing signals. The high voltage circuit 20 is provided to supply a high voltage of about 24,000–30,000 kilovolts to an anode of the cathode ray tube 16. The high voltage circuit 20 includes a flyback transformer (not shown) supplying grid voltages to grids G1, G2 and G3 (not shown) of the cathode ray tube 16. The heater circuit 22 supplies power to heaters (not shown) of the electron guns within the cathode ray tube 16.

In FIG. 2, the primary power supply 24 outputs a variety of direct current electric powers to associated monitor circuit components using an alternating current input power. The hub power supply 26 applies a hub power to the universal serial bus peripheral devices, via universal serial bus hub ports, using one of the direct current powers from the primary power supply 24. The monitor controller 12 cuts off the hub power to the peripheral devices when the hub power exceeds a predetermined power, thus preventing the universal serial bus device failure due to excessive power. The predetermined power could be a rated power. The on-screen display controller 28 displays hub power status on a partial area of a display monitor screen in accordance with the control of the monitor controller 12.

In FIG. 2, video power savings for the monitor circuit are achieved in accordance with version 1.0 of the display power management signaling (DPMS) standard, dated Aug. 20, 1993, supported by the Video Electronics Standards Association (VESA). The Video Electronics Standards Association is an international non-profit corporation that supports and sets industry-wide interface standards for personal computer, workstation, and computing environments. Members of the Video Electronics Standards Association include hardware, software, personal computer, display and component manufacturers, cable and telephone companies, and service providers.

Power saving modes of the display power management signaling standard may be classified into a power-on mode, a standby mode, a suspend mode, and a power-off mode. The power saving mode of the display monitor is controlled by the horizontal and vertical synchronizing signals supplied from a host supporting the power savings modes. A personal computer may be the host.

If both types of synchronizing signals are supplied from the host, the display monitor apparatus is operated in the power-on mode. In the power-on mode, a high level of electrical power is supplied to the display monitor apparatus, such that full operational use of the display monitor apparatus is possible.

When only the vertical synchronizing signal is fed from the host, the power supply mode of the display monitor apparatus becomes the standby mode, in which a first group of circuits are put into a reduced power state. Standby mode saves about 30% of the power required for power-on mode and allows the display monitor apparatus to change to power-on mode instantly, as soon as needed.

When only the horizontal synchronizing signal is supplied from the host, the display apparatus is put into the suspend mode, in which a second group of circuits are put into a reduced power state. Suspend mode saves more power than standby mode by powering off the cathode ray tube's main heater but requires up to 5 seconds to change to power-on mode.

When no synchronizing signals are provided from the host, the display monitor apparatus is put into the power-off mode. In such a case, electrical power supplied to the display monitor apparatus is changed to a low level, such that the screen of the display monitor apparatus is blank. Power-off mode saves more power by turning power off to everything except the monitor's microprocessor.

Figure 3:
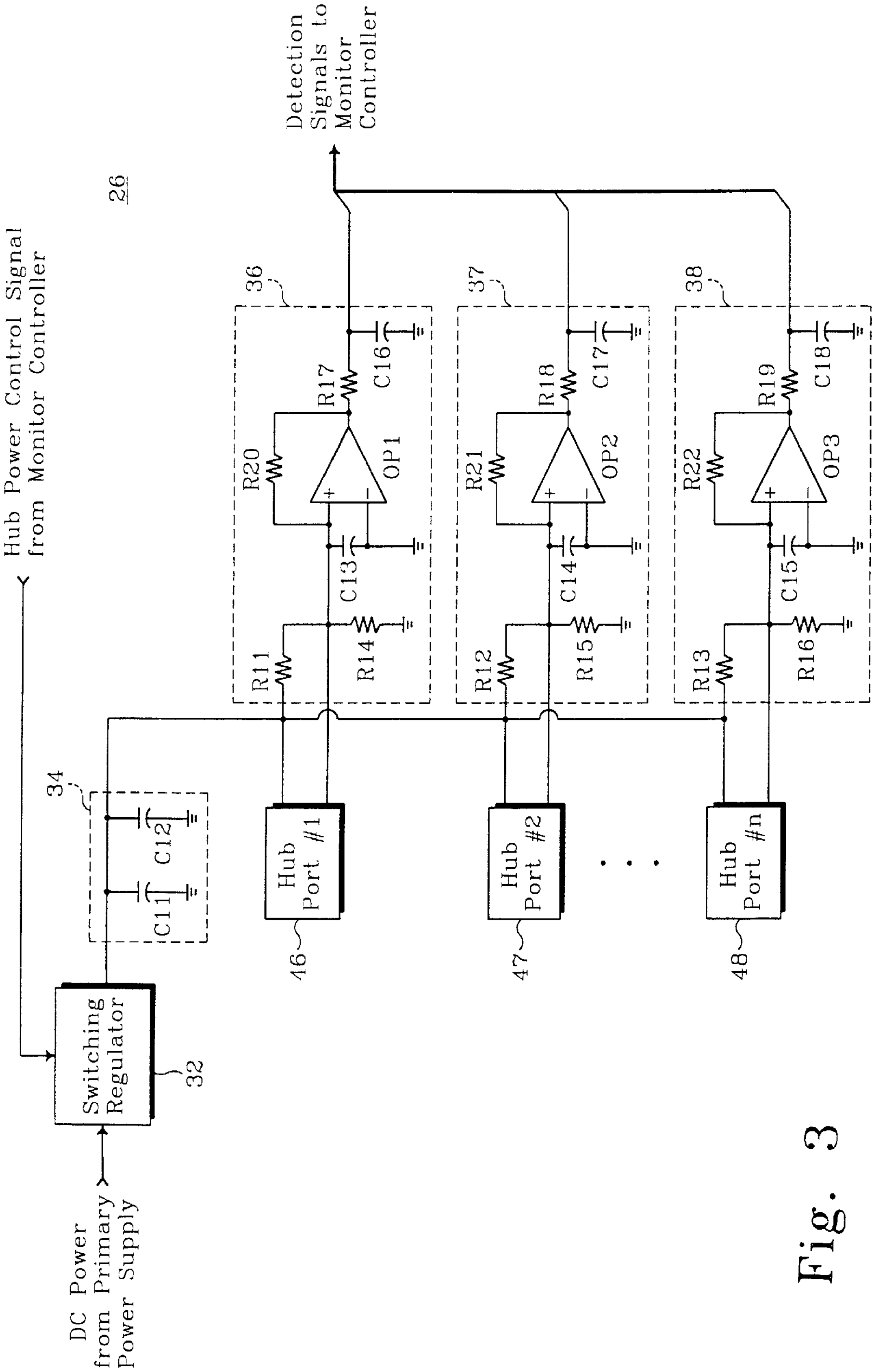
FIG. 3 illustrates a detailed circuit diagram of the hub power supply of FIG. 2, according to the principles of the present invention.

Referring now to FIG. 3, which illustrates a detailed circuit diagram of the hub power supply of FIG. 2, according to the principles of the present invention. The hub power supply 26 includes a switching regulator 32, a filter circuit 34 composed of capacitors C11 and C12, and a hub power detection circuit. The hub power detection circuit is comprised of a plurality of port power detecting circuits 36, 37 and 38 respectively corresponding to the hub ports 46, 47 and 48.

In FIGS. 2 and 3, the switching regulator 32 is provided in order to control the supply of a hub power supply voltage from the primary power supply 24 to the universal serial bus hub ports 46,47 and 48. The power supplied from the primary power supply 24 to the universal serial bus hub ports 46, 47 and 48 is a direct current power. The hub power supply voltage is supplied to the universal serial bus hub ports 46, 47 and 48 in order to supply voltage to universal serial bus peripheral devices (not shown) plugged into ports 46, 47 and 48.

In FIG. 3, the switching regulator 32 controls the supply of the hub power supply voltage in accordance with a hub power control signal from the monitor controller 12. The switching regulator 32 supplies the hub power supply voltage to the universal serial bus hub ports 46, 47 and 48 when the hub power control signal from the monitor controller 12 is active. The switching regulator 32 cuts off the supply hub power supply voltage to the universal serial bus hub ports 46, 47 and 48 when the hub power control signal from the monitor controller 12 is inactive.

In FIG. 3, the port power detecting circuit 36 is composed of an operational amplifier OP1, resistors R11, R14, R17 and R20, and capacitors C13 and C16. The port power detecting circuit 37 is composed of an operational amplifier OP2, resistors R12, R15, R18 and R21, and capacitors C14 and C17. The port power detecting circuit 38 is composed of an operational amplifier OP3, resistors R13, R16, R19 and R22, and capacitors C15 and C18.

In FIG. 3, each of the port power detecting circuits 36, 37 and 38 detects whether the hub power supply voltage on each hub port 46, 47 or 48 is beyond a predetermined voltage, and generates a detection signal when the hub power supply voltage exceeds the predetermined voltage. The predetermined voltage could be a rated voltage. The detection signals generated by the port power detecting circuits 36, 37 and 38 are provided to the monitor controller 12. The monitor controller 12 disables the switching regulator 32 when at least one of the detection signals is active, and thus the hub supply voltage to the universal serial bus hub ports is cut off.

Figure 4:
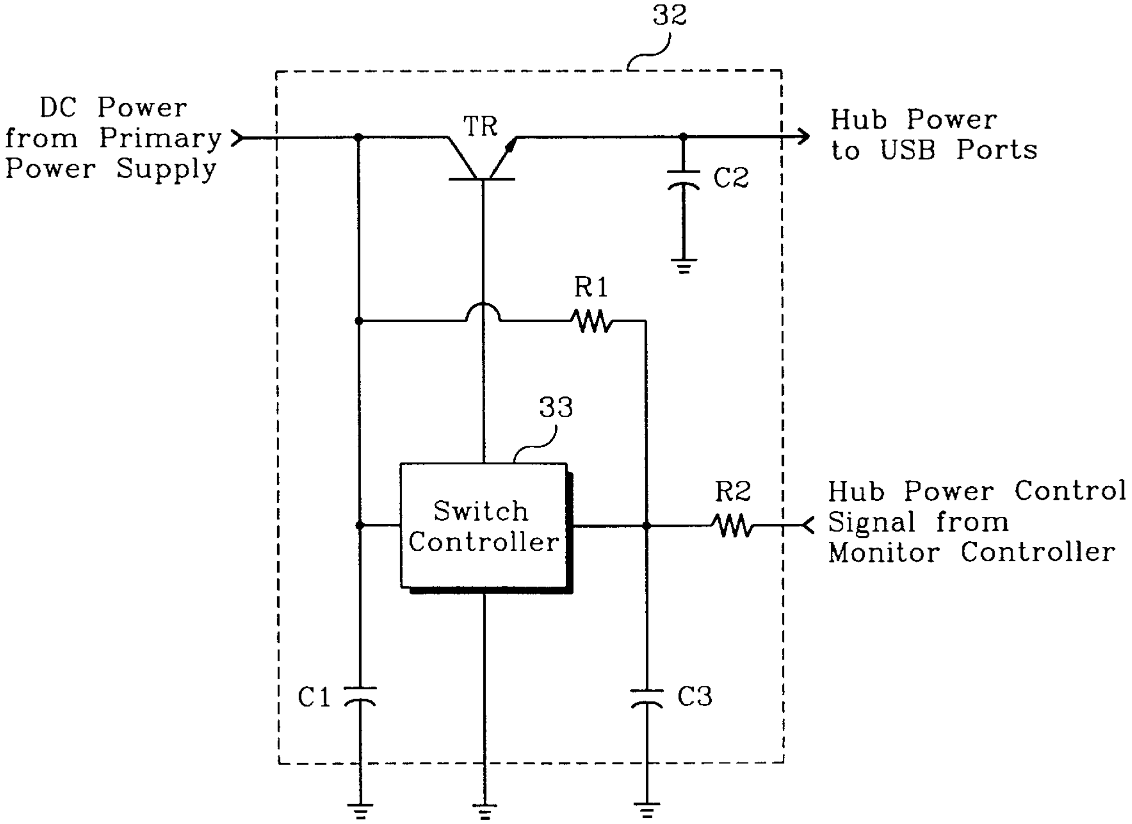
FIG. 4 illustrates a detailed circuit diagram of the switching regulator of FIG. 3, according to the principles of the present invention.

Turning now to FIG. 4, which illustrates a detailed circuit diagram of the switching regulator of FIG. 3, according to the principles of the present invention. As shown in the figure, the switching regulator 32 is composed of a bipolar transistor TR serving as a switch, a switch controller 33 for controlling the hub power supply voltage constantly, resistors R1 and R2, and capacitors C1, C2 and C3. The switch controller 33 is enabled/disabled in response to the hub power control signal from the monitor controller 12.

Figure 5:
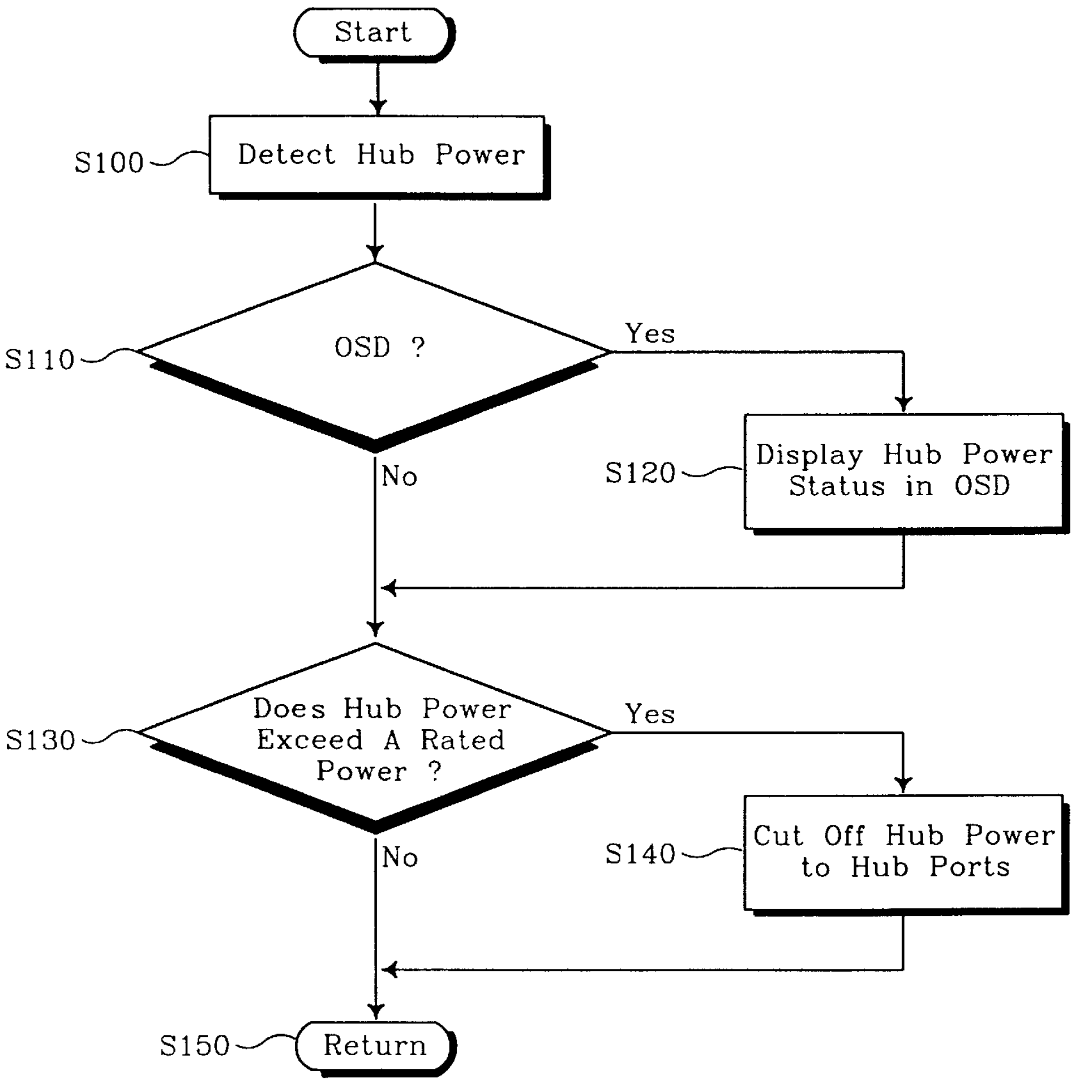
FIG. 5 illustrates a flowchart of a novel method for controlling computer monitor power, according to the principles of the present invention.

Turning now to FIG. 5, which illustrates a flowchart of a novel method for controlling computer monitor power, according to the principles of the present invention. The control program for performing the novel method is executed by means of the monitor controller 12.

In FIG. 5, at step S100, the monitor controller 12 detects the hub power supplied to respective hub ports 46, 47 and 48 via the port power detection circuits 36, 37 and 38. The control flow then proceeds to step S110, wherein it is determined whether a user requires to display the hub power status on the partial area of the display monitor screen, that is, in on-screen display form. If so, the control flow advances to step S120, wherein the on-screen display controller 28 displays the hub power status on the partial area of the display monitor screen under the control of the monitor controller 12. At step S110, if the on-screen display of the hub power status is not required, the flow continues to step S130, wherein it is determined whether the hub power is in excess of a predetermined power. An example of a predetermined power is a rated power. If the hub power exceeds the predetermined power, the flow proceeds to step S140 wherein the monitor controller 12 cuts off the hub power to the hub ports 46, 47 and 48 by disabling the switching regulator 32. If not, the flow turns back to step S100.

As described above, the universal serial bus display monitor apparatus according to the present invention is capable of preventing universal serial bus devices from device failures due to excessive hub power, and communicating universal serial bus hub power status to a user.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A display monitor apparatus that controls power in a plurality of peripheral devices coupled to a computer, comprising:

a universal serial bus hub, having one upstream universal serial bus port connected to said computer and a plurality of downstream universal serial bus ports respectively connected to said plurality of peripheral devices;

a hub power supply supplying a power to said plurality of peripheral devices through said plurality of downstream universal serial bus ports;

a hub power detection circuit detecting an excessive voltage on any one of said plurality of downstream universal serial bus ports and generates a detection signal for cutting off said power supplied to said plurality of peripheral devices;

a video display conveying varying visual information to a user;

a primary power supply receiving alternating current power from a source, and supplies a direct current voltage to said hub power supply;

a monitor controller controlling said video display, said primary power supply and said hub power supply, and receives said detection signal generated by said hub power detection circuit;

an on-screen display controller driving said video display to display images corresponding to status of said hub power supply, in accordance with said control of said monitor controller, to inform said user of said status;

said hub power supply comprising:

a switching regulator, controlling said supply of said direct current voltage from said primary power supply to said hub power supply, having a first terminal connected to said primary power supply, a second terminal connected to said monitor controller, and a third terminal; and a filter circuit including a predetermined number of capacitors, disposed between said third terminal of said switching regulator and said plurality of downstream universal serial bus ports;

said filter circuit comprising:

a first capacitor, having a first terminal connected to said third terminal of said switching regulator and a second terminal connected to a reference potential.

2. The display monitor apparatus of claim 1, wherein said display monitor apparatus responds to synchronization signals from said computer to operate in accordance with power saving modes comprising:

a power-on mode, existing when a horizontal synchronization signal and a vertical synchronization signal are supplied to said display monitor apparatus from said computer, causing a high level of electrical power to be supplied to said display monitor apparatus, allowing full operational use of said display monitor apparatus;

a standby mode, existing when said horizontal synchronization signal is not supplied and said vertical synchronization signal is supplied to said display monitor apparatus, causing a first intermediate level of electrical power to be supplied to said display monitor apparatus, causing a first group of circuits to be inoperational such that said display monitor apparatus is able to change to said power-on mode in response to a request after a first delay, said first intermediate level of electrical power being below said high level of electrical power;

a suspend mode, existing when said horizontal synchronization signal is supplied and said vertical synchronization signal is not supplied to said display monitor apparatus, causing a second intermediate level of electrical power to be supplied to said display monitor apparatus, causing a second group of circuits to be inoperational such that said display monitor apparatus is able to change to power-on mode in response to said request after a second delay, said second intermediate level of electrical power being below said first intermediate level of electrical power, and said second delay being longer than said first delay; and a power-off mode, existing when no synchronization signals are supplied to said display monitor apparatus, causing a low level of electrical power to be supplied to said display monitor apparatus, causing a third group of circuits to be inoperational such that said display monitor apparatus is able to change to power-on mode in response to said request after a third delay, said low level of electrical power being below said second intermediate level of electrical power, and said third delay being longer than said second delay.

3. The display monitor apparatus of claim 1, wherein said monitor controller is a microcomputer.

4. The display monitor apparatus of claim 1, wherein said on-screen display controller displays said status of said hub power supply onto a partial area of said video display.

5. The display monitor apparatus of claim 1, wherein said video display corresponds to one of a cathode ray tube and a liquid crystal display and a gas-plasma display.

6. The display monitor apparatus of claim 1, wherein said display monitor apparatus transmits a signal to a printer coupled to said display monitor apparatus, displaying said hub power supply status to said user.

7. The display monitor apparatus of claim 3, wherein said on-screen display controller displays said status of said hub power supply onto a partial area of said video display.

8. The display monitor apparatus of claim 3, wherein said display monitor apparatus transmits a signal to a printer coupled to said display monitor apparatus, displaying said hub power supply status to said user.

9. The display monitor apparatus of claim 7, wherein said switching regulator comprises:

a transistor, having a first electrode of a principal electrically conducting channel connected to said primary power supply, a second electrode of a principal electrically conducting channel connected to said third terminal of said switching regulator, and a control electrode;

a switch controller, having a first terminal connected to said control electrode of said transistor, a second terminal connected to a reference potential, a third terminal connected to said first electrode of said transistor, and a fourth terminal;

a first capacitor, disposed between said first electrode of said transistor and said reference potential;

a second capacitor, disposed between said reference potential and said second electrode of said transistor;

a first resistor, disposed between said first electrode of said transistor and said fourth terminal of said switch controller;

a second resistor, disposed between said fourth terminal of said switch controller and said second terminal of said switching regulator; and a third capacitor, disposed between said fourth terminal of said switch controller and said reference potential.

10. The display monitor apparatus of claim 7, wherein each of said plurality of downstream universal serial bus ports comprises:

a first terminal, connected to one of said plurality of peripheral devices, supplying said direct current voltage to said one of said plurality of peripheral devices;

a second terminal, connected to said third terminal of said switching regulator, receiving said direct current voltage from said third terminal of said switching regulator; and a third terminal, connected to said hub power detection circuit.

11. The display monitor apparatus of claim 10, wherein said hub power detection circuit comprises a plurality of port power detecting circuits, each of said plurality of port power detecting circuits is respectively connected to one of said plurality of downstream universal serial bus ports.

12. The display monitor apparatus of claim 11, wherein each of said plurality of port power detecting circuits comprises:

a first terminal, connected to said second terminal of its respective downstream universal serial bus port and said third terminal of said switching regulator;

a second terminal, connected to said third terminal of its respective downstream universal serial bus port;

a third terminal, connected to said monitor controller supplying said detection signal to said monitor controller;

a first resistor, having a first terminal connected to said third terminal of said switching regulator, and a second terminal connected to said third terminal of its respective downstream universal serial bus port;

a second resistor, having a first terminal connected to said second terminal of said first resistor and a second terminal connected to a reference potential;

a first capacitor, having a first terminal connected to said first terminal of said second resistor and a second terminal connected to said reference potential;

a third resistor, having a first terminal connected to said first terminal of said first capacitor and a second terminal;

an operational amplifier, having an inverting input connected to said reference potential, a noninverting input connected to said first terminal of said first capacitor, and an output connected to said second terminal of said third resistor;

a fourth resistor, having a first terminal connected to said second terminal of said third resistor, and a second terminal connected to said third terminal of said first one of said plurality of port power detecting circuits; and a second capacitor having a first terminal connected to said second terminal of said fourth resistor and a second terminal connected to said reference potential.

13. The display monitor apparatus of claim 1, wherein said universal serial bus hub comprises a plurality of secondary universal serial bus hubs, each of said plurality of secondary universal serial bus hubs having a plurality of upstream universal serial bus ports and a plurality of downstream universal serial bus ports.

14. An apparatus, comprising:

a video display unit conveying varying visual information to a user, said video display unit having one or more universal serial bus hubs, said video display unit further comprising:

a first device, receiving an alternating current power from a source and outputting a plurality of direct current powers to a plurality of peripheral devices;

a plurality of universal serial bus hub ports, disposed between said one or more universal serial bus hubs and said plurality of peripheral devices;

a second device, receiving one of said plurality of direct current powers from said first device, and outputting a direct current hub power to said plurality of peripheral devices through said one or more universal serial bus hubs;

a third device, controlling said direct hub power, blocking said plurality of peripheral devices from receiving said direct current hub power when said direct current hub power exceeds a predetermined power level, and preventing failure of said plurality of peripheral devices;

a fourth device, controlling a display of status of said direct current hub power; and a fifth device, displaying said status of said direct current hub power to communicate said status to the user, according to control of said fourth device;

said second device comprising:

a switching regulator, controlling said one of said plurality of direct current powers, having a first terminal connected to said first device, a second terminal connected to said third device, and a third terminal; and a filter circuit including a predetermined number of capacitors, disposed between said third terminal of said switching regulator and said plurality of peripheral devices;

said filter circuit comprising:

a first capacitor, having a first terminal connected to said third terminal of said switching regulator and a second terminal connected to a reference potential.

15. A display monitor apparatus used with a computer system and having one or more universal serial bus hubs connecting a plurality of peripheral devices to the computer system, comprising:

a first device, receiving an alternating current power from a source and outputting a plurality of direct current powers to said plurality of peripheral devices;

a plurality of universal serial bus hub ports, disposed between said one or more universal serial bus hubs and said plurality of peripheral devices;

a second device, receiving one of said plurality of direct current powers from said first device, and outputting a direct current hub power to said plurality of peripheral devices through said one or more universal serial bus hubs, said second device further comprising:

a switching regulator, controlling said one of said plurality of direct current powers, having a first terminal connected to said first device, a second terminal connected to a third device, and a third terminal;

a lowpass filter circuit including a predetermined number of capacitors, disposed between said third terminal of said switching regulator and said plurality of peripheral devices; and a detecting circuit, disposed between said filter circuit and said plurality of peripheral devices, detecting whether said direct current hub power is in excess of a predetermined power level;

said third device, controlling said direct current hub power, blocking said plurality of peripheral devices from receiving said direct current hub power when said direct current hub power exceeds a predetermined power level, and preventing failure of said plurality of peripheral devices;

a fourth device, controlling a display of status of said direct current hub power; and a fifth device, displaying said status of said direct current hub power to communicate said status to a user, according to control of said fourth device;

said lowpass filter circuit comprising:

a first capacitor, having a first terminal connected to said third terminal of said switching regulator and a second terminal connected to a reference potential.

16. The apparatus of claim 14, said third device comprising a microcomputer, said fourth device comprising an on-screen display controller, and said fifth device comprising a cathode ray tube.

17. A method for controlling power in a display monitor apparatus coupled to a computer system and a plurality of peripheral devices, comprising the steps of:

receiving an alternating current power from a source;

converting said alternating current power to a direct current hub power;

transmitting said direct current hub power from a primary power supply to a hub power supply;

detecting said direct current hub power;

determining whether said direct current hub power received by said hub power supply exceeds a predetermined power level;

controlling transmission of said direct current hub power from said hub power supply to said plurality of peripheral devices;

when said direct current hub power does not exceed said predetermined power level, transmitting said direct current hub power from said hub power supply to said plurality of peripheral devices through a plurality of universal serial bus ports;

when said direct current hub power exceeds said predetermined power level, discontinuing said transmission of said direct current hub power from said hub power supply to said plurality of peripheral devices through said plurality of universal serial bus ports;

displaying a status of said direct current hub power to a user;

controlling said supply of said direct current hub power from said primary power supply to said hub power supply, said controlling being performed by a switching regulator having a first terminal connected to said primary power supply, and having a different terminal; and coupling a filter circuit between said different terminal of said switching regulator and said plurality of universal serial bus ports, said filter circuit including primary and secondary capacitors connected in parallel.

18. The method of claim 17, wherein said display monitor apparatus comprises a monitor controller, preventing said direct current hub power from reaching said plurality of peripheral devices when said direct current hub power exceeds said predetermined level.

19. The method of claim 18, wherein said hub power supply comprises:

said switching regulator, having said first terminal connected to said primary power supply, a second terminal connected to said monitor controller, and a third terminal, said different terminal corresponding to said third terminal.

20. The method of claim 19, wherein said switching regulator comprises:

a transistor, having a first electrode of a principal electrically conducting channel connected to said primary power supply, a second electrode of a principal electrically conducting channel connected to said third terminal of said switching regulator, and a control electrode;

a switch controller, having a first terminal connected to said control electrode of said transistor, a second terminal connected to a reference potential, a third terminal connected to said first electrode of said transistor, and a fourth terminal;

a first capacitor, disposed between said first electrode of said transistor and said reference potential;

a second capacitor, disposed between said reference potential and said second electrode of said transistor;

a first resistor, disposed between said first electrode of said transistor and said fourth terminal of said switch controller;

a second resistor, disposed between said fourth terminal of said switch controller and said second terminal of said switching regulator; and a third capacitor, disposed between said fourth terminal of said switch controller and said reference potential.

* * * * *